United States Patent [19]
Newton et al.

[11] Patent Number: 5,860,275
[45] Date of Patent: Jan. 19, 1999

[54] METHOD OF COMBINING DUCTED FAN GAS TURBINE ENGINE MODULES AND AIRCRAFT STRUCTURE

[75] Inventors: Arnold C Newton; Andrew C Pickard, both of Derby, England

[73] Assignee: Rolls-Royce plc, London, England

[21] Appl. No.: 779,611

[22] Filed: Jan. 7, 1997

[51] Int. Cl.⁶ .................................................. F02K 3/02
[52] U.S. Cl. ........................ 60/226.1; 60/39.31; 244/54
[58] Field of Search ............................. 60/39.31, 39.32, 60/226.1; 244/54; 415/216.1; 416/244 A

[56] References Cited

U.S. PATENT DOCUMENTS

| | | | |
|---|---|---|---|
| 2,680,346 | 6/1954 | Michael | 60/39.31 |
| 4,361,296 | 11/1982 | Hall et al. | 60/226.1 |
| 4,603,821 | 8/1986 | White . | |
| 5,452,575 | 9/1995 | Freid | 60/39.31 |
| 5,524,847 | 6/1996 | Brodell et al. | 244/54 |

FOREIGN PATENT DOCUMENTS

| | | | |
|---|---|---|---|
| 302669 | 8/1987 | European Pat. Off. . | |
| 292655 | 11/1988 | European Pat. Off. | 244/54 |
| 197803 | 3/1978 | United Kingdom | 60/39.31 |
| 2275308 | 8/1994 | United Kingdom | 60/39.31 |

*Primary Examiner*—Charles G. Freay
*Assistant Examiner*—Ted Kim
*Attorney, Agent, or Firm*—W. Warren Taltavull; Farkas & Manelli PLLC

[57] ABSTRACT

In a ducted fan gas turbine engine the fan module is connected rigidly to aircraft structure and flexibly to the core gas generator via flanged annular diaphragms (62,66) thus obviating the exertion of bending loads on the core gas generator casing when the fan intake experiences asymmetric aerodynamic loads.

10 Claims, 2 Drawing Sheets

METHOD OF COMBINING DUCTED FAN GAS TURBINE ENGINE MODULES AND AIRCRAFT STRUCTURE

THE FIELD OF THE INVENTION

The present invention relates to a method of interconnecting the fan module and the core gas generator of a ducted fan, gas turbine engine to each other and to aircraft structure.

BACKGROUND OF THE INVENTION

Since the advent of the ducted fan gas turbine engine for the powering of aircraft, the ratio of the thrust produced by the fan relative to that produced by the associated core gas generator, has increased several fold. In order to achieve this the fan dimensions have increased, with a consequent increase in the dimensions of its associated cowling which provides the ducting therefor.

The increase in the dimensional proportions of the fan cowl has resulted in an increase in the aerodynamic loads experienced thereby during operation on an associated aircraft. This is especially the case during take off of the associated aircraft when the plane of the cowl air inlet is at an angle to the direction of movement of the aircraft which results in the ambient air flowing into the intake in asymmetric manner.

The asymmetrical aerodynamic load applied to the fan cowl is transferred via the fan outlet guide vanes to the core gas generator which in prior art arrangements is rigidly connected to the inner ends thereof. Severe bending of the core gas generator results, which in turn causes, inter alia, compressor blade tip rub on the inner walls of the compressor casing which forms a part of the core gas generator. The operational efficiency of the engine is thus impaired.

SUMMARY OF THE INVENTION

The present invention seeks to provide an improved method of interconnecting the fan module and core gas generator of a ducted fan, gas turbine engine to each other and to an aircraft to be driven thereby.

According to the present invention in a combination of a ducted fan gas turbine engine comprising a fan module and a core gas generator, and an aircraft, a method of interconnecting the fan module comprising a stage of shaft-mounted fan blades surrounded by a cowl, and the core gas generator, to each other and to the aircraft to be driven thereby comprises connecting said fan module to aircraft structure via rigid links, connecting said core gas generator to said aircraft structure via further rigid links and connecting the fan module to the core gas generator via annular flexible diaphragms.

BRIEF DESCRIPTION OF THE DRAWINGS

The invention will now be described, by way of example, and with reference to the accompanying drawings in which.

DETAILED DESCRIPTION OF THE INVENTION

Figure 1:
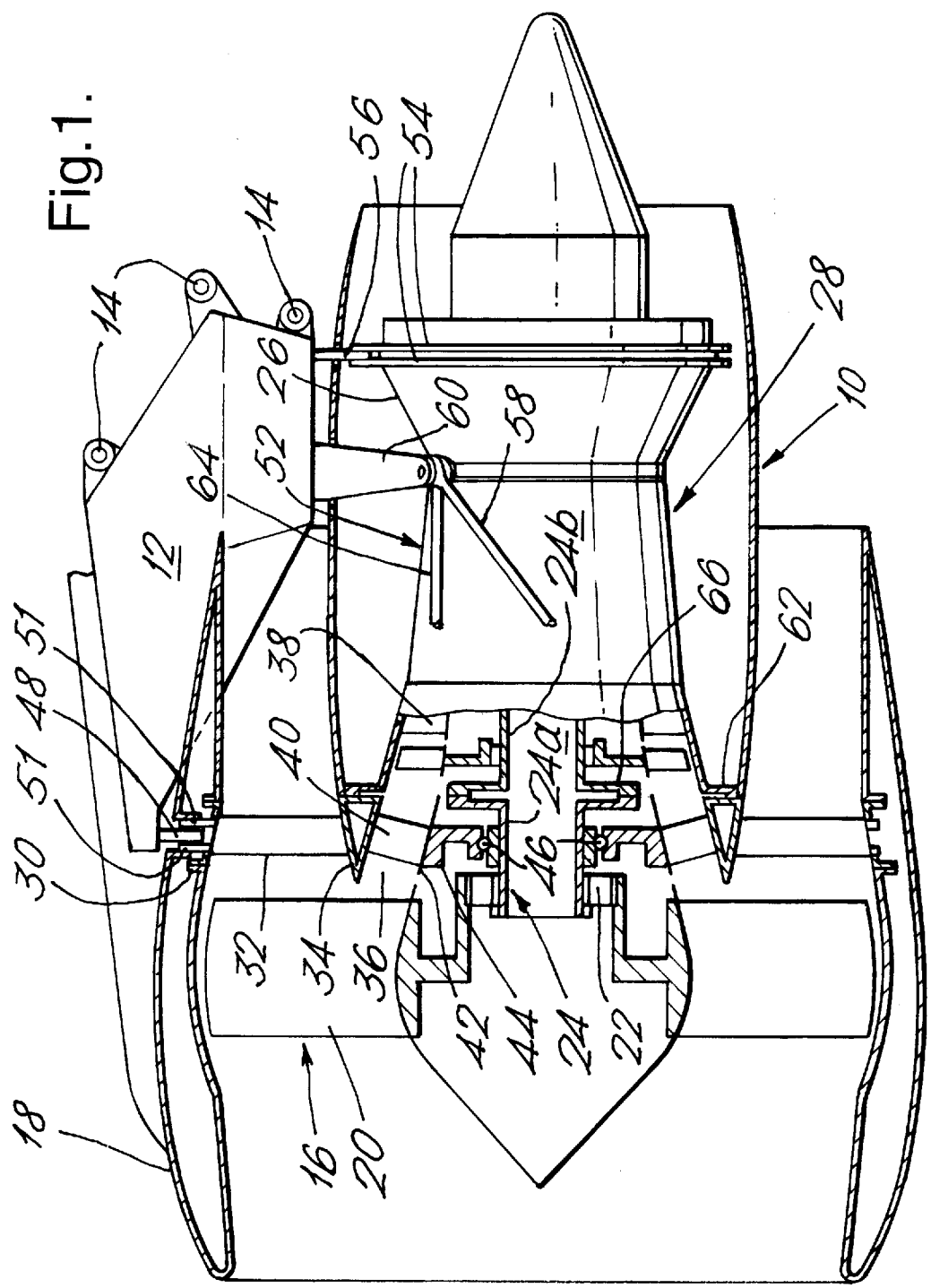
FIG. 1 is a diagrammatic, part cross sectional view of a ducted fan gas turbine engine in accordance with the present invention.

Referring to FIG. 1 a ducted fan gas turbine engine 10, in the particular example, has a three shaft configuration (not shown) ie a high pressure turbine drives a first stage high pressure compressor via a shaft, an intermediate pressure turbine drives an intermediate stage compressor via a further shaft, and a low pressure turbine which receives gas flow from the intermediate stage turbine, drives a fan via a further shaft either directly or through gearing. There is no mechanical drive connection between the three shafts, though bearings space them apart to ensure concentricity therebetween.

The three shaft configuration as described so far, is well known and per se does not form the present invention.

In FIG. 1, a pylon 12 is fixable, via lugs 14, to an aircraft wing main beam (not shown). The pylon 12 supports the ducted fan gas turbine engine 10 with which the aircraft (not shown) is powered.

The engine 10 includes a fan module 16 having a cowl 18, surrounding a stage of fan blades 20 which in operation is rotated via gears 22 and a shaft 24, connected to a low pressure turbine stage (not shown) within the turbine casing 26 of a core gas generator 28.

The cowl 18 is fixed to an annular flange structure 30 made up from flange portions on the outer ends of fan air outlet guide vanes 32. The inner ends of the guide vanes 32 are joined to a common ring 34 which defines the outer surface of the air intake 36 for the low pressure compressor 38 of the core gas generator 28.

Struts 40 extend across the air intake 36 to a conical member 42 which defines the inner surface thereof and which in turn surrounds an annular disc 44 housing a bearing 46 by means of which the upstream end portion of the fan shaft 24 is radially supported.

The fan module 16 is connected to the upstream end of the pylon 12 in the following manner. A peg 48 fits into a socket between the flanges which provide the flange structure 30, in a direction radially inwardly of the engine 10. The peg 49 transmits the engine 10 thrust loads into the pylon 12 and therefore the aircraft (not shown).

Figure 2:
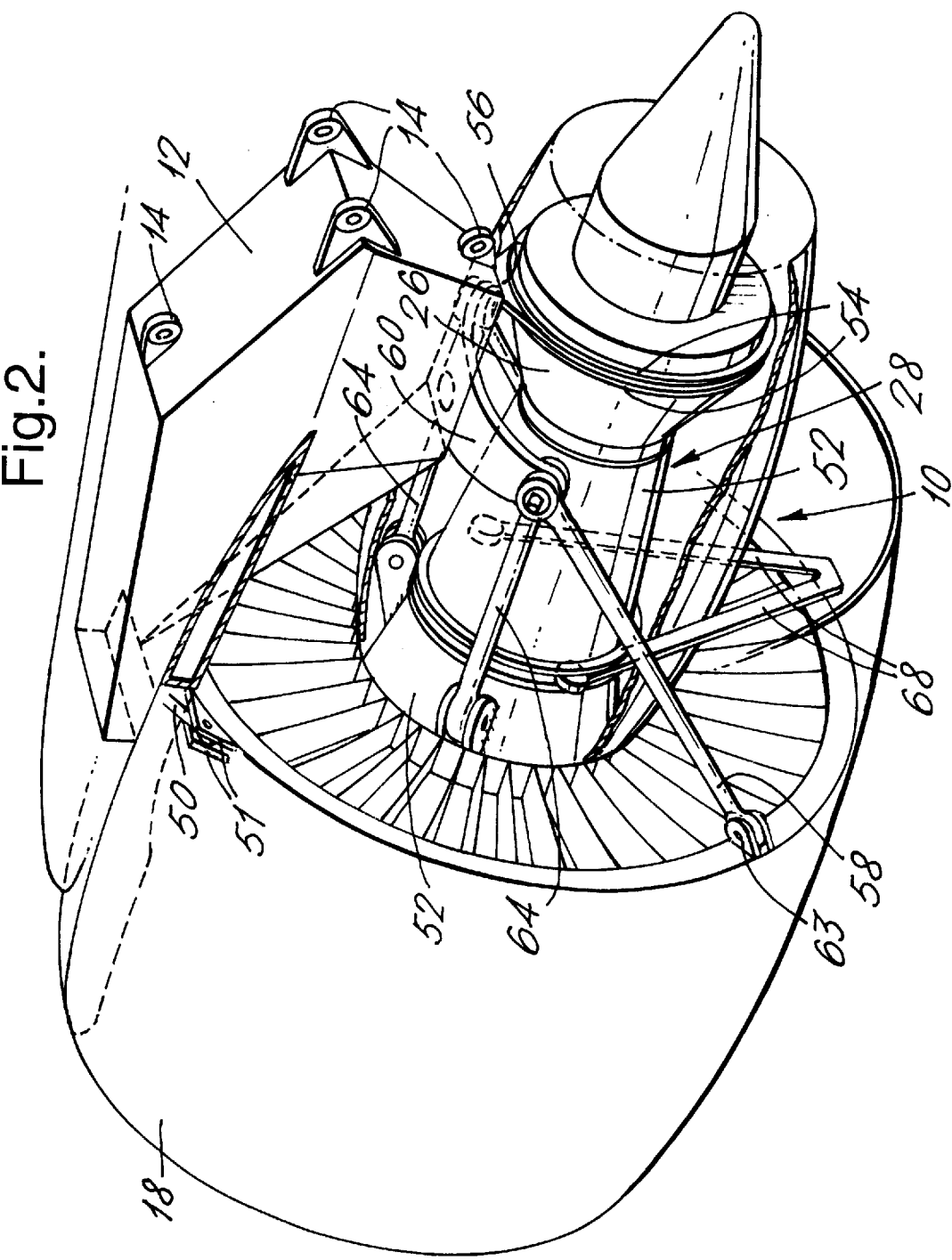
FIG. 2 is a pictorial view of the engine of FIG. 1.

Links 50 of which only one is shown in FIG. 2, extend tangentially of the flange structure 30, on each side of the peg 48. Links 50 have their ends connected in known manner, to the pylon 12 and local flanges 51 between flanged structure 30 respectively, so as to counter vertical loads and any tendency of the cowl 18 to rotate about the longitudinal axis of the engine 10.

The core gas generator 28 comprises the compressor 38, a high pressure compressor (not shown) combustion equipment (no shown) in a casing 52, and a multistage turbine (not shown) in flow series therewith within the casing 26. Casing 26 has double flanges 54. A link structure 56 connects and supports the downstream end of the core gas generator 28 from the pylon 12 in the same manner as links 50 support the fan module ie against vertical and rotational movement. Again, this feature per se, is known.

The connection of the engine 10 to the pylon 12 as described so far, is not sufficient to obviate bending loads being applied to the core gas generator casing 52 when the fan cowl 18 experiences asymmetric loads. This is because the asymmetric loads cause the fan cowl to pivot about a fulcrum which lies within the area intermediate the links 50, the pivoting movement occurring in a clockwise direction as viewed in FIG. 1. The resulting loads are transmitted via the guide vanes 32, to the upstream end of the core gas generator casing 52 and causes it to bend.

It has been found that, as a first step towards considerably reducing the bending effect produced by asymmetric loading, the fan cowl 18 can be stabilised as regards its attitude relative to the remainder of the engine 10, by providing a pair of links 58, one end of each of which is connected to the pylon 12, and the ends connected to the flanged structure 30 of the guide vanes 32 at positions 63 equi-angularly spaced form top dead centre of the fan cowl. This latter feature is shown in FIG. 2.

In the present example, in order that the links 58 may be orientated to positions where the loads they must counter, are applied as near axially thereto as is possible, bearing in mind the spacial constraints imposed by engine structure, a yoke 60 is provided, which is fixed to the pylon 12 so as to be effectively integral therewith and the links 58 are connected to respective ends thereby. However, yoke 60 may be obviated and links 58 extended to connect with the pylon 12 at its downstream end, again subject to spacial constraints.

The aforementioned first step is of course a bracing arrangement and whilst it reduces the movement of the fan cowl under asymmetric loads, and therefore the bending loads on the core gas generator, it cannot obviate all movement thereof. Therefore, a second step has been devised which converts the remaining fan cowl movement into movement relative to the core gas generator 28 rather than forcing the core gas generator 28 to bend.

This is achieved by providing the upstream end of the core gas generator casing 52 with an annular diaphragm flange 62, which has a thickened rim for the passage of bolts or other suitable fastening means therethrough, and fastening the flange 62 via its thickened rim, to the downstream annular face of the ring 34.

The second step further includes dividing the fan shaft into an upstream stub shaft 24a and a downstream main shaft portion 24b and re-joining them by a further annular diaphragm flange 66 formed, in the present example, on the upstream end of the main shaft portion 24b.

It is preferred that the interfaces of the two joints described hereinbefore lie in a common plane radially of the axis of the engine 10.

A pair of thrust links 64 are connected between the yoke 60 and the casing 52 near its upstream end. This latter connection is shown more clearly in FIG. 2. The links transmit the thrust generated by the core gas generator to the aircraft via the pylon 12 and is a well known feature which per se does not form the present invention.

A further pair of links 68 interconnect the core gas generator 28 and the cowl 18 to mitigate lateral roll of the cowl 18. The man skilled in the particular art, on reading this specification will appreciate that the combination of bracing links 58 and flexible diaphragms 62,66 as described herein, obviates the majority of the bending forces on the core gas generator and reduces sufficient of the remaining force by way of the diaphragms 62,66 allowing relative articulation of fan module and core gas generator, as to reduce bending loads on the core gas generator to negligible proportions.

Whilst the invention has been described hereinbefore with reference to a three shaft engine, it could also be applied to a two shaft engine, wherein the fan is driven via gears, from a shaft which connects a compressor stage and a turbine stage. In this arrangement the flexible diaphragm would be provided on the said connecting shaft.

We claim:

1. In a combination of a ducted fan gas turbine engine comprising a fan module and a core gas generator, and an aircraft, a method of inter-connecting the fan module comprising a stage of shaft-mounted fan blades surrounded by a cowl, and the core gas generator to each other and to the aircraft to be driven thereby comprising the steps of connecting said fan module to aircraft structure via rigid links, connecting said core gas generator to said aircraft structure via further rigid links, and connecting the fan module to the core gas generator via flanged annular flexible diaphragms.

2. The method of claim 1 including the step of forming the fan shaft from a stub shaft and a main shaft portion, joined via a flanged annular diaphragm.

3. The method of claim 1 including the step of forming a radially outwardly turned, flanged annular diaphragm on an upstream end of a casing surrounding the core gas generator and connecting said diaphragm to annular structure on the fan module and which locates radially inner ends of an air outlet guide vanes on the fan module.

4. The method of claim 2 wherein said engine has an axis, said annular flexible diaphragms comprise interfaces defining joints with said interfaces extending in planes and including the step of arranging the planes of the interfaces of the respective diaphragms in a common plane normal to the engine axis.

5. The method as claimed in claim 1 including the step of providing a pylon as said aircraft structure and which is removably fixable to said aircraft and includes connection features for connecting said fan module and said core gas generator thereto.

6. The method as claimed in claim 5 including the steps of connecting the fan module to said pylon at an upstream end of said pylon via rigid links which are arranged such that their lengths are tangential to a periphery of outer ends of a stage of fan air outlet guide vanes forming part of the fan module, in opposing directions and are connected thereto via respective ends, other ends of said rigid links being connected to the pylon at positions closely adjacent each other and straddling top dead center of the stage of outlet guide vanes, and further connecting the fan module to the pylon at a position intermediate upstream and downstream ends via ends of a further pair of rigid links, the other ends of which are connected to said outer ends of said stage of fan air outlet guide vanes at positions equi-angularly spaced from top dead center thereof.

7. The method as claimed in claim 6 including the step of connecting the core gas generator to said pylon via a pair of rigid links connected between an upstream portion of an outer casing of the core gas generator and an intermediate portion of the pylon, and including the further step of connecting the downstream portion of the core gas generator to a downstream end portion of the pylon via links which support the weight of the core gas generator to restrain rotation thereof.

8. The method as claimed in claim 5 wherein said pylon has ends and including the step of providing the pylon with a yoke which extends partially around the core gas generator in radially spaced relationship therewith in a position intermediate said ends of the pylon and utilizing the yoke ends as connection points for said links.

9. The method of claim 8 including the step of forming the yoke separately from the pylon and then removably fixing the yoke thereto so as to be effectively integral therewith for operation.

10. In a combination of a ducted fan gas turbine engine comprising a fan module and a core gas generator, a method of inter-connecting the fan module comprising a stage of shaft-mounted fan blades surrounded by a cowl, and the core gas generator to each other and to an aircraft structure comprising the steps of connecting said fan module to the aircraft structure via rigid links, connecting said core gas generator to the aircraft structure via further rigid links, and connecting the fan module to the core gas generator via flanged annular flexible diaphragms.

* * * * *